May 3, 1949.　　　　　E. C. THOMSON　　　　　2,468,791
CONDUCTIVITY CONTROL

Filed June 30, 1945　　　　　　　　　　　　　　2 Sheets-Sheet 1

Inventor
E. Craig Thomson.
By James C. Hamilton
Attorney

May 3, 1949.  E. C. THOMSON  2,468,791
CONDUCTIVITY CONTROL
Filed June 30, 1945  2 Sheets-Sheet 2
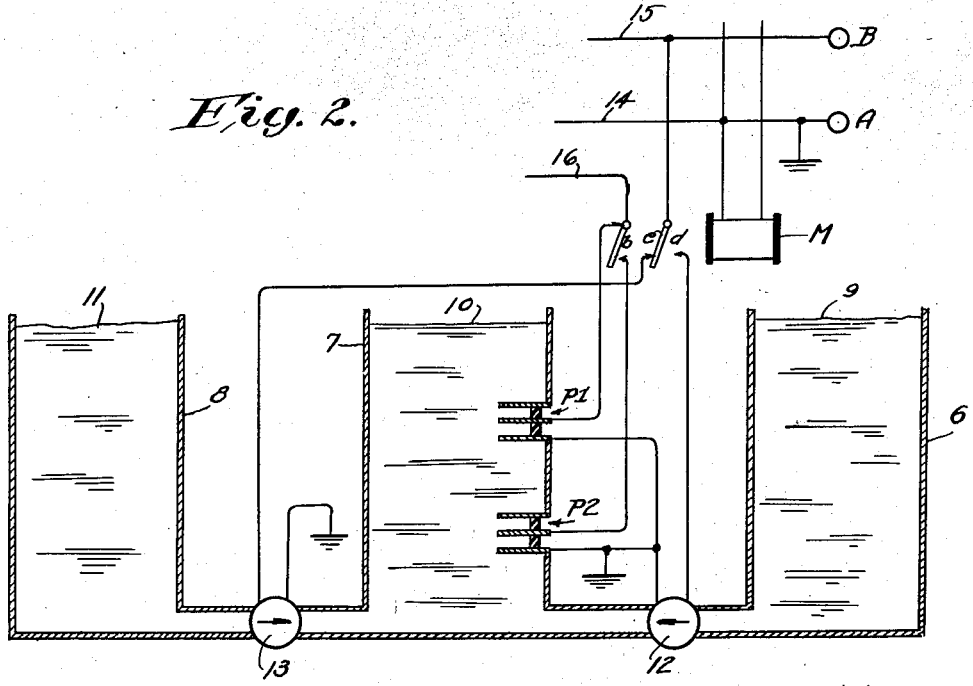
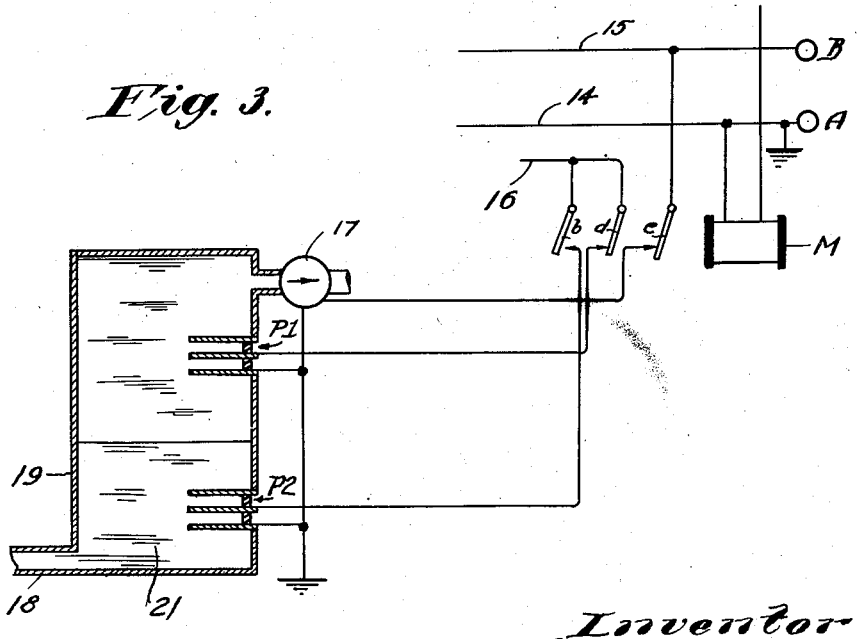
Inventor
E. Craig Thomson
By James C. Hamilton
Attorney Patented May 3, 1949

2,468,791

UNITED STATES PATENT OFFICE 2,468,791

CONDUCTIVITY CONTROL

E. Craig Thomson, Boston, Mass., assignor to Photoswitch, Incorporated, Cambridge, Mass., a corporation of Massachusetts Application June 30, 1945, Serial No. 602,590

5 Claims. (Cl. 103—25)

The present invention relates to apparatus for controlling the conductivity of liquids and more particularly for controlling the concentration of liquids whose electrical conductivity may be used as a measure of concentration and for controlling the level of liquids of different conductivities. In many industrial processes it is necessary to maintain liquid in a vessel at a given concentration or to remove liquid from a tank when a certain concentration has been reached. In other processes it may be required to control the level of materials of various conductivities between upper and lower limits in a vessel.

The principal object of this invention is to provide a control of this type which responds to very small changes in conductivity and yet is unaffected by fluctuations in line voltage or changes in tube characteristics;

Another object of my invention is to provide a control which is readily and continuously adjustable to operate at any desired value of a wide range of conductivities;

Another object of my invention is to provide a control which is continuous and automatic, requiring no attention from an operator or sampling of the liquid in the vessel;

A still further object of my invention is to provide a control especially suited for permitting removal from a vessel of a certain portion of material which is at the desired concentration and preventing removal of another portion of the material which is at a different concentration;

Other objects are to maintain a fluid solution or mixture in a vessel at a given concentration within very narrow limits of deviation; to maintain the interface between materials, one of which may be air, of different conductivities, within certain high and low limits in a vessel;

These and other objects, advantages, and features of my invention will be more fully apparent from the following description of several embodiments thereof.

The description refers to drawings in which

Fig. 2 is a modification of my invention used to maintain the liquid in a vessel at a certain concentration; and Fig. 3 is a modification of my invention used to maintain the interface between two liquids within certain limits of level.

Figure 1:
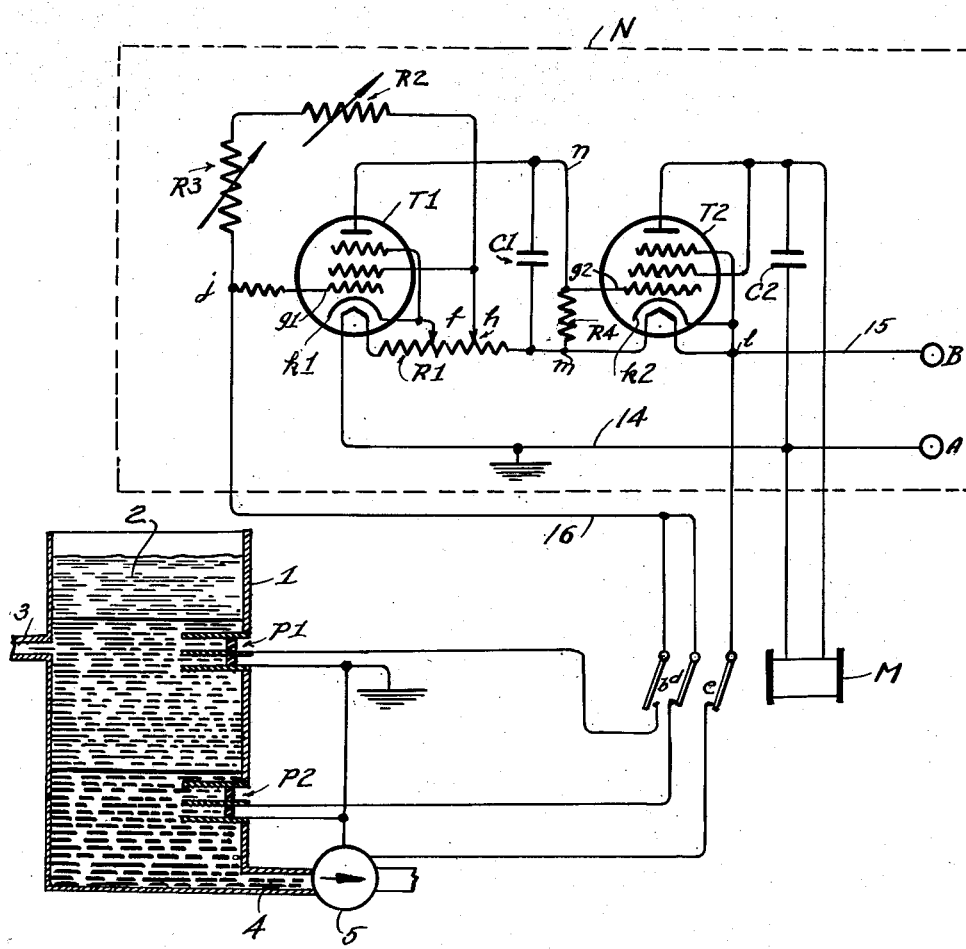
Fig. 1 is a diagrammatic representation of my invention as used on a liquid which varies in concentration in different parts of the tank, to control removal of that portion of the material which has the desired concentration.

Referring more in detail to Fig. 1, I is a tank containing a mixture of materials 2 of different conductivities, for example creosote and water. The level of material 2 in tank I is continuously maintained through pipe 3 from any suitable source, as a storage tank. A probe P2 of the type consisting essentially of three conductive plates separated by insulating spacers as described in pending application for System of flat electrodes, Serial No. 518,131, Patent No. 2,426,252, August 26, 1947, is installed near the bottom of tank I. A second probe PI of the sametype is installed in tank I at a higher level than probe P2. A pump 5 when energized removes material from tank I through pipe 4. M is a relay of any conventional type having auxiliary contacts $b$, $d$, and $e$. Contacts $d$ and $e$ are normally closed when the relay is deenergized and contact $b$ is normally open. The adjustment of the contacts is such that when the relay is energized, contact $b$ closes before contact $d$ opens. Depending on the condition of relay M, probe PI or probe P2 may be connected into circuit N. Variable resistor R3 provides for large adjustments of the impedance between points $h$ and $j$ of circuit N and variable resistance R2 provides for fine adjustments.

The operation of the device is as follows:

Tank I is filled with the mixture of creosote and water. Creosote, being heavier than water, tends to settle to the bottom. After the mixture has remained undisturbed for some time it will be found that the moisture content of the mixture decreases uniformly from the top to the bottom of the tank. Since creosote is less conductive than water, the conductivity of the mixture likewise decreases uniformly from top to bottom of the tank. As the mixture continues to remain undisturbed, the two liquids continue to separate out and the level of material of any given moisture content, and correspondingly of any given conductivity continues to rise.

Assume first that terminals A and B are supplied with alternating current and that relay M is energized closing contact $b$ and opening contacts $d$ and $e$. Probe PI is then in the circuit and pump 5 deenergized. During the half cycle in which terminal B is negative, no current flows through tube TI because the plate of tube TI is negative with respect to the cathode. Since current flows through the heater of tube T2 from point $m$ to point $l$, control grid $g2$ of tube T2 is more positive than cathode $k2$. The plate of tube T2 being connected through relay M to positive terminal A, current flows in the plate circuit of tube T2, relay M is energized, and condenser C2 becomes charged. During the half cycle in which terminal B is positive, current may flow in tube TI. If, however, the combined impedance of resistors R2 and R3 is so adjusted with respect to the impedance of probe PI that the potential drop across R2 and R3 from tap $h$ to point $j$ is greater than the potential drop from tap $h$ to tap $f$, control grid $g1$ of tube TI is negative with respect to cathode $k1$ and no current flows through tube TI. This condition occurs when the probe is immersed in material of higher than the desired moisture content as measured by conductivity. During this period the plate of tube T2 is negative with respect to cathode k2. Condenser C2, however, discharges the charge which it received on the preceding half cycle causing current to flow through relay M and the relay remains energized.

Assume now that the settling of the heavier material as explained above lowers the moisture content and consequently the conductivity of the mixture in the vicinity of probe P1. The impedance of probe P1 increases and the potential of control grid g1 is raised. It is apparent that R2 and R3 can be readily adjusted so that any desired value of conductivity of the liquid at probe P1 will raise the potential of control grid g1 to the point where current may flow through tube T1. Assuming first that terminal B is positive, current flows in the plate circuit of tube T1, charging condenser C1. The plate of tube T2 being negative with respect to cathode k2 during this period, no current flows in the plate circuit of tube T2. If terminal B is negative, no current flows in tube T1. Condenser C1 discharges the charge which it received on the preceding half cycle causing current to flow through resistor R4 from point m to point n. The value of the circuit components are such that the voltage drop thus produced is greater than the voltage drop across the heater, and grid g2 becomes negative with respect to cathode k2, blocking the flow of current through tube T2. Since no charge was imparted to condenser C2 on the preceding half cycle, relay M becomes deenergized, contacts d and e are closed and contact b open. The closing of contact d and opening of contact b connects probe P2 into the circuit in place of probe P1. The closing of contact e starts pump 5. Since the liquid at the level of probe P2 has a lesser moisture content, and is therefore less conductive, than that at the level of probe P1, the potential of control grid g1 remains high, no current flows through tube T2 and relay M remains deenergized as previously explained in this paragraph. Pump 5 removes liquid from the tank through pipe 4 and a fresh supply of the mixture flows in through pipe 3. As material of increasing moisture content reaches the level of probe P2, the impedance of probe P2 decreases and the potential of control grid g1 becomes lower. When grid g1 becomes sufficiently negative with respect to cathode k1 to prevent the flow of current through tube T1, tube T2 becomes conductive and relay M is energized as before, closing contact b and opening contacts d and e. Since probes P1 and P2 are of identical construction, this action will occur when the conductivity of the liquid at the level of probe P2 is at the value for which resistors R2 and R3 were originally adjusted. The closing of contact b and opening of contact d connects probe P1 into the circuit in place of probe P2. The opening of contact e stops pump 5 and the material in the tank is again allowed to remain undisturbed until material of the desired moisture content has settled out to the level of probe P1.

Another embodiment of my invention is shown in Fig. 2 in which 7 is a tank filled with liquid which it is desired to maintain at a given concentration, for example, a dilute acid; 8 is a tank containing a material 11 of high conductivity in concentrated form, for example, a concentrated acid; and 6 is a tank containing a diluting material 9 of lower conductivity, for example, water. Pumps 12 and 13, when energized, are arranged to pump liquid into tank 7 from tanks 9 and 11 respectively. Probes P1 and P2 are installed in tank 7, preferably close together. In this case the two liquids mix readily so that the concentration of the liquid surrounding the two probes at any instant may be assumed to be the same. Connections are made to contacts b, d, and e of relay M as shown. Contacts b and d are normally open and contact e normally closed when the relay is deenergized. Connections are made to conductors 15, 16, and 17 of the circuit shown in Fig. 1. The operation is as follows:

Terminals A and B are supplied with alternating current and resistors R2 and R3 are adjusted to balance the impedance of one probe immersed in fluid of the desired concentration as before. Assume that the concentration of liquid 10 is higher than desired. In this condition the impedance of probe P1 is low, tube T1 is nonconductive, tube T2 is conductive and relay M becomes energized as previously explained in the reference of Fig. 1. When relay M is energized, probe P2 is connected into the circuit, pump 13 is stopped and pump 12 is running. The connection of probe P2 in parallel with probe P1 lowers the impedance of the circuit from point j to ground and still further reduces the potential of control grid g1 so that relay M remains energized. The introduction of diluting liquid from tank 6 by pump 12 into tank 7 gradually lowers the concentration and therefore the conductivity of liquid 10. The combined impedance of probes P1 and P2 increases and the potential of grid g1 is raised. When the potential of grid g1 is sufficiently high to permit tube T1 to become conductive, tube T2 becomes nonconductive and relay M is deenergized, opening contacts b and d and closing contact e. Probe P2 is then disconnected from the circuit. Since the impedance of probe P1 alone is higher than the impedance of the two probes in parallel, relay M remains deenergized. Pump 12 is then stopped and pump 13 running. The introduction of material of high concentration from tank 11 by pump 13 gradually raises the concentration and, therefore, the conductivity of liquid 10. When the impedance of probe P1 becomes sufficiently low, tube T1 again becomes nonconductive, relay M is energized, pump 13 is stopped, pump 12 started, and probe P2 connected into the circuit. The concentration of liquid 10 is thus continuously maintained within certain limits of deviation from the desired value, the amount of deviation being governed by the area of the probes and the nature of the liquids.

Another embodiment of my invention is shown in Fig. 3 in which 19 is a closed tank containing a liquid 20 of low specific gravity and low conductivity, for example, gasoline, which forms a layer on top of a liquid 21 of relatively high specific gravity and relatively high conductivity, for example, water. In many installations such as gasoline storage tanks, the tank must be kept filled to the top to prevent accumulation of explosive vapors. It is customary in such cases to introduce water under the necessary pressure into the bottom of the tank to replace the gasoline as it is pumped out and it is desirable to stop the pumping operation before water reaches the level of the pump. In this illustration of my invention, the circuit and relay contact arrangement is the same as shown in Fig. 1. Probe P1 is connected to normally open contact d and probe P2 to normally closed contact b. The device operates as follows:

With relay M deenergized, pump P1 is energized, and probe PI is connected into the circuit. If PI is immersed in gasoline its impedance is high; therefore the potential of grid $g1$ is high and relay M remains deenergized. When water reaches the level of probe PI, lowering its impedance, relay M becomes energized as previously explained, closing contact $b$ and opening contacts $d$ and $e$. The pump is stopped and probe P2 is connected into the circuit in place of probe PI. Probe P2 being immersed in water, its impedance is low, and the relay remains energized. If the tank is again filled with gasoline from another source, the level of the water is lowered. When gasoline reaches the level of probe P2, the impedance of the probe is raised and relay M becomes deenergized so that pump 17 is again energized and probe PI connected into the current.

It is apparent from Fig. 1 that the potential of grid $g$, with respect to cathode $k$, is dependent chiefly on the relative value of the impedance from point $h$ to point $j$ as compared to the impedance from point $j$ through whatever probe or combination of probes may be connected into the circuit, to ground and that, therefore, the operation of the device is unaffected by considerable fluctuation in the voltage applied to terminals A and B. It is further apparent that operation of the device is not dependent on the exact amount of current flowing through either tube as long as the current is adequate to energize relay M and, therefore, a certain amount of deterioration in the tubes does not affect the accuracy of the device.

It should be understood that the present disclosure is for the purpose of illustration only and that this invention includes all modifications and equivalents which fall within the scope of the appended claims.

Having thus described my invention, what I claim as new is:

1. For a vessel wherein a desired fluid is allowed to settle out of a mixture of said desired fluid and a carrying fluid, a system for controlling the removal of said desired fluid from said vessel comprising: a first and a second probe device immersed in the mixture of fluids in said vessel at a first and a second level respectively, each probe device having at least a first and a second element adapted for measuring the impedance therebetween and consequently the conductivity and concentration of the fluids therebetween; a relay amplifier system having an output circuit containing an operator means and at least a first and a second input terminal adapted for connection to said probe devices, in order to use them as detecting impedances, said system being adapted to place said operator means in a first condition when the value of the detecting impedance across said input terminals is within a first predetermined range of values and to place said operator means in a second condition when the value of the detecting impedance across said input terminals is within a second predetermined range of values; means connecting said first elements of said probe devices to said first input terminal; pump means for removing fluid from said vessel from a point below said second level; and switch means actuated by said operator means adapted, during the period said operator means is in said first condition, to connect said second element of said first probe device to said second input terminal and to render said pump means inoperative and, during the period said operator means is in said second condition, to connect said second element of said second probe device to said second input terminal and to render said pump means operative; whereby, when the impedance measured by said first probe device is within said first predetermined range depending on the conductivity of the mixture of fluids surrounding said first probe, said operator means is placed in said second condition, said second probe device is substituted for said first probe device as the detecting impedance, and said pump is rendered operative and, when the impedance measured by said second probe device is within said second predetermined range depending on the conductivity of the mixture of fluids surrounding said second probe, said operator means is placed in said first condition, said first probe device is substituted for said second probe device as the detecting impedance, and said pump is rendered inoperative.

2. A system for liquid solution control comprising: a vessel for containing the solution the concentration of which is to be controlled; a first supply tank and a concentrating solution element therein; a second supply tank and a diluting solution element therein; first and second conduits connecting said first and second supply tanks respectively to said vessel; first and second pumps in said first and second conduits respectively, each adapted to pump the respective solution element into said vessel; first and second probe devices immersed in said vessel, each probe device having at least a first and a second element adapted for measuring the impedance therebetween and consequently the conductivity and concentration of the solution therebetween; a relay amplifier system having an output circuit containing an operator means and at least first and second input terminals, adapted for connection to said probe devices, said system being adapted to place said operator means in a first condition when the impedance across said input terminals is within a first predetermined range of values and to place said operator means in a second condition when the impedance across said input terminals is within a second predetermined range of values; means connecting the first element of each of said probe devices to said first input terminal; means connecting the second element of said first probe device to said second input terminal; and switch means actuated by said operator means adapted, during the period said operator means is in said first condition, to connect the second element of said second probe device to said second input terminal and to render said second pump operative and, during the period said operator means is in said second condition, to render said first pump operative; whereby when the concentration of the solution in the vessel exceeds a predetermined value, the operator means is placed in said first condition and said diluting solution element is pumped into the vessel until the concentration of the solution reaches another predetermined value, when the operator means is placed in said second condition and said concentrating solution element is pumped into the vessel until the concentration of the solution again exceeds a predetermined value.

3. For a storage tank for storing a fluid having means for maintaining the space therein not occupied by the stored fluid filled with a filler fluid which is immiscible with the stored fluid, a control system for permitting the removal of only the stored fluid comprising: first and second probe devices immersed in said storage tank at first and second levels respectively, each probe device having at least first and second elements adapted for measuring the impedance therebetween and consequently the conductivity of the fluid therebetween; a relay amplifier system having an output circuit containing an operator means and at least two input terminals adapted for connection to said probe devices in order to use them as detecting probes, said system being adapted to place said operator means in a first condition when the detecting probe is immersed in said stored fluid and to place said operator means in a second condition when the detecting probe is immersed in said filler fluid; means connecting the first element of each of said probe devices to one of said input terminals; a pump for removing said stored fluid from said tank; and switch means actuated by said operator means adapted, during the period said operator means is in said first condition, to connect said other input terminal to the second element of said second probe device and to place said pump in an inoperative condition and, during the period said operator means is in said second condition, to connect said other input terminal to the second element of said first probe device and to place said pump in an operative condition; whereby when said first and second probe devices are immersed in said stored fluid, said pump is rendered operative and said first probe becomes the detecting probe and, when said first probe device becomes immersed in said filler fluid, said pump is rendered inoperative and said second probe device becomes the detecting probe until it becomes immersed in said stored fluid.

4. For a system having a mixture of two fluids in a tank and a pump for varying the supply of one of the fluids therein depending upon the conductivity of the fluids measured at a first and a second level in said tank, a device for controlling the operation of said pump comprising: first and second probe devices immersed in the fluids in said tank at first and second levels respectively, each probe device having at least first and second elements adapted for measuring the impedance therebetween and consequently the conductivity and the concentration of the fluids therebetween; a relay amplifier system having an output circuit containing an operator means and at last first and second input terminals adapted for connection to said probe devices in order to use them as detecting impedances, said relay system being adapted to place said operator means in a first operative condition when the value of the detecting impedance across said input terminals is within a first predetermined range of values and to place said operator means in a second operative condition when the value of the detecting impedance across said input terminals is within a second predetermined range of values; means connecting said first elements of said probe devices to said first input terminal; means for controlling said pump adapted to be placed in either a first control condition or a second control condition; and switch means actuated by said operator means adapted, during the period said operator means is in said first operative condition, to connect said second element of one of said probe devices to said second input terminal and to place said control means in said first control condition and, during the period said operator means is in said second operative condition, to connect the second element of the other of said probe devices to said second input terminal and to place said control means in said second control condition; whereby, when the impedance measured by one of said probe devices is within said first predetermined range depending on the conductivity of the fluids surrounding such probe device, the other probe device is substituted for said one probe device as the detecting impedance, and said control means is placed in said first control condition and, when the impedance measured by the other probe device is within said second predetermined range depending on the conductivity of the fluids surrounding such probe device, said one probe device is substituted for said other probe device as the detecting impedance, and said control means is placed in said second control condition.

5. For a system having a mixture of fluids in a tank and means for varying the supply of fluids therein, a device for controlling the means for varying the supply of fluids therein comprising: two probe devices immersed in the fluids in said tank, each device having at least first and second elements adapted for measuring the impedance therebetween and consequently the conductivity and concentration of the fluids therebetween; a relay amplifier having an output circuit containing an operator means and at least first and second input terminals adapted for connection to said probe devices in order to use them as detecting impedances, said relay system being adapted to place said operator means in a first operative condition when the value of the detecting impedance across said input terminals is within a first predetermined range of values and to place said operator means in a second operative condition when the value of the detecting impedance across said input terminals is within a second predetermined range of values; means connecting said first elements of said probe devices to said first input terminal; means for controlling said supply varying means adapted to be placed in either of two control conditions; and switch means actuated by said operator means adapted, during the period said operator means is in said first operative condition, to connect said second input terminal in one connection condition with respect to said second elements of said probe devices and to place said control means in one of said control conditions, and during the period said operator means is in said second operative condition, to connect said second input terminal in another connection condition with respect to said second elements and to place said control means in the other of said control conditions; whereby, when the impedance measured under one connection condition is within said first predetermined range, the other connection condition is substituted and said control means is placed in one of said control conditions and, when the impedance measured under the other of said connection conditions is within said second predetermined range, the one connection condition is substituted for the other and the control means is placed in the other control condition.

E. CRAIG THOMSON.

REFERENCES CITED

The following references are of record in the file of this patent:

UNITED STATES PATENTS

| Number | Name | Date |
|---|---|---|
| 1,372,187 | Ogilive | Mar. 22, 1921 |
| 2,084,186 | Braden | June 15, 1937 |
| 2,306,237 | Wolfner | Dec. 22, 1942 |
| 2,357,371 | Wolfner | Sept. 5, 1944 |
| 2,377,363 | Noble et al. | June 5, 1945 |